US009370197B1

(12) United States Patent
Karpinsky et al.

(10) Patent No.: US 9,370,197 B1
(45) Date of Patent: Jun. 21, 2016

(54) CONICAL DRUM BREADER AND METHODS OF USE THEREOF (75) Inventors: James Karpinsky, Poynette, WI (US); James Bakos, Poynette, WI (US); Scott Rose, Columbus, WI (US); Adam Smith, Baraboo, WI (US)

(73) Assignee: Vibratory Solutions, LLC, Lodi, WI (US)

( * ) Notice: Subject to any disclaimer, the term of this patent is extended or adjusted under 35 U.S.C. 154(b) by 1148 days.

(21) Appl. No.: 13/409,223

(22) Filed: Mar. 1, 2012

Related U.S. Application Data (60) Provisional application No. 61/448,488, filed on Mar. 2, 2011.

(51) Int. Cl.
*A23G 3/26* (2006.01)
*A23G 3/20* (2006.01)
*A23P 1/08* (2006.01)
*B05C 3/05* (2006.01)
*B05C 3/08* (2006.01)

(52) U.S. Cl.
CPC ............... *A23G 3/2076* (2013.01); *A23G 3/26* (2013.01); *A23P 1/082* (2013.01); *B05C 3/05* (2013.01); *B05C 3/08* (2013.01)

(58) Field of Classification Search
CPC ........ A23G 3/2076; A23G 3/26; A23P 1/082; A23L 1/31; B05C 3/05; B05C 3/08
USPC .................. 118/19, 22, 23, 28–30, 417, 418; 426/289, 295
See application file for complete search history.

(56) References Cited

U.S. PATENT DOCUMENTS

| 580,644 A | 4/1897 | Ham |
| 2,625,903 A * | 1/1953 | Opie .................... A23G 3/2076 118/19 |
| 2,659,338 A | 11/1953 | Harrison |
| 3,245,518 A | 4/1966 | Reibel et al. |
| 3,707,769 A | 1/1973 | Syrjanen et al. |

(Continued)

FOREIGN PATENT DOCUMENTS

CA 2670805 1/2008

OTHER PUBLICATIONS

Robins Vibro Batter and Breading Machine, Robins Food Processing Machinery, A.K. Robins and Company, Incorporated, p. 230.
(Continued)

*Primary Examiner* — Laura Edwards
(74) *Attorney, Agent, or Firm* — Craig A. Fieschko, Esq.; DeWitt Ross & Stevens S.C.

(57) ABSTRACT

An apparatus for applying coating to food products including a drum assembly that includes a drum with one or more conical flights, wherein food products and coating are received at a drum intake end, and the coating is further applied to the products using a conical and rotational motion of the drum, and wherein the food products and coating are discharged at a drum discharge end. A method for applying coating to food products including receiving products and coating at an inlet end of a feed assembly, discharging the products and coating from the feed assembly into a drum assembly, applying coating to the products inside the drum assembly using a conical and rotational motion, discharging the coating and products from the drum assembly, and conveying the coating and products using vibratory motion.

20 Claims, 8 Drawing Sheets

(56) References Cited

U.S. PATENT DOCUMENTS

| | | |
|---|---|---|
| 4,248,173 A | 2/1981 | Kuhlman |
| 4,313,535 A | 2/1982 | Carmichael |
| 4,889,241 A | 12/1989 | Cogan et al. |
| 4,936,248 A | 6/1990 | Miller |
| RE33,542 E | 2/1991 | Musschoot |
| 5,052,330 A | 10/1991 | Stacy |
| 5,150,798 A | 9/1992 | Mills, Jr. |
| 5,238,303 A | 8/1993 | Dixon |
| 5,238,493 A | 8/1993 | Miller |
| 5,267,672 A | 12/1993 | Jacobsen et al. |
| 5,555,967 A | 9/1996 | Hufford |
| 5,643,361 A | 7/1997 | Wadell |
| 5,728,216 A | 3/1998 | London |
| 5,762,176 A | 6/1998 | Patterson et al. |
| 5,868,241 A | 2/1999 | Pellegrino |
| 5,908,117 A | 6/1999 | Stroman et al. |
| 5,937,744 A | 8/1999 | Nothum et al. |
| 6,000,320 A | 12/1999 | Herrick, IV |
| 6,019,216 A | 2/2000 | Patterson |
| 6,079,550 A | 6/2000 | Gilman |
| 6,079,698 A | 6/2000 | Patterson et al. |
| 6,117,235 A | 9/2000 | Toccaceli et al. |
| 6,142,292 A | 11/2000 | Patterson |
| 6,161,680 A | 12/2000 | Martin et al. |
| 6,179,117 B1 | 1/2001 | Gilamn |
| D443,501 S | 6/2001 | Sleppy |
| 6,250,471 B1 | 6/2001 | Ruthven et al. |
| 6,253,908 B1 | 7/2001 | Gilman |
| 6,279,731 B1 | 8/2001 | Anderson |
| 6,286,658 B1 | 9/2001 | Hufford |
| 6,308,822 B1 | 10/2001 | Moran et al. |
| 6,325,202 B1 | 12/2001 | Gaines |
| 6,415,913 B2 | 7/2002 | Sleppy et al. |
| 6,457,577 B1 | 10/2002 | Ikeda et al. |
| 6,460,680 B1 | 10/2002 | Hufford |
| 6,486,481 B1 | 11/2002 | Tigera |
| 6,631,799 B2 | 10/2003 | Samson |
| 6,655,523 B2 | 12/2003 | Jones et al. |
| 6,659,267 B2 | 12/2003 | Patterson |
| 6,705,459 B1 | 3/2004 | Musschoot |
| 6,834,756 B2 | 12/2004 | Sullivan, Jr. |
| 6,868,960 B2 | 3/2005 | Jones |
| 6,962,128 B2 | 11/2005 | Dove et al. |
| 7,174,846 B2 | 2/2007 | Zeegers et al. |
| 7,418,920 B2 | 9/2008 | Kuenen |
| 7,827,929 B2 | 11/2010 | Garrison et al. |
| 2001/0051538 A1 | 12/2001 | Suzuki et al. |
| 2003/0041746 A1 | 3/2003 | Schmidt |
| 2006/0156931 A1 | 7/2006 | Mather et al. |
| 2008/0283366 A1* | 11/2008 | Karpinsky .............. A21C 9/04 198/763 |

OTHER PUBLICATIONS

MP Equipment Company, Brochure, "MP Drum Breader"; http://www.mpequipment.com/products/breader_drum.html.

Meyer + Garroutte Systems, Brochure, Garroutte Closed Pocket Elevator, "Unique Conveyor Meters Product with No Spilling,"; www.meyer-industries.com.

Marchant Schmidt, Inc. Products>Products Topping Applicators. "Topping Applicator"; http://www.marchantschmidt.com/item_detail.php?id-64, (Mar. 2007).

Stein Associates, Inc., Brochure, "XL Breading Machine" SP-0471-986.

Compositlex, Brochure, "Composite Springs"; www.composiflex.com.

P.J. Prause Durotec GmbH, Brochure, "Fatigue strength of S-PLY leaf springs".

Renold Ajax, Brochure, "Rotart Electric Vibrators".

Volta Belting Technology Ltd., Brochure, "SuperDrive, The Hygienic Positive-Drive Belt", (Sep. 2003).

Intralox, Brochure, "Series 800".

"A composite housing with integrated performance features".

"How to select the right overhung load adaptors".

Flat-Flex, Brochure, "Mesh guide".

Eaton, Brochure, "Low speed high torque motors", Aug. 2006.

Non-Final Office Action mailed May 28, 2009 for U.S. Appl. No. 11/396,202, filed Mar. 30, 2006.

Notice of Allowance mailed Dec. 16, 2009, for U.S. Appl. No. 11/396,202, filed Mar. 30, 2006.

Ex Parte Quayle Office Action mailed on Dec. 4, 2009, for U.S. Appl. No. 12/126,610, filed May 23, 2008.

Non-Final Office Action mailed Aug. 9, 2011 for U.S. Appl. No. 12/271,632.

CA Office Action for CA Pat. App. No. 2719158 mailed Feb. 8, 2012.

US Office Action for U.S. Appl. No. 12/541,700 mailed May 6, 2012.

* cited by examiner

CONICAL DRUM BREADER AND METHODS OF USE THEREOF

CROSS-REFERENCE TO RELATED APPLICATIONS

This application claims priority under 35 U.S.C. §119(e) to U.S. Provisional Patent Application No. 61/448,488, filed Mar. 2, 2011, the entirety of which is incorporated by reference herein.

FIELD OF THE INVENTION

The field of invention includes coating and conveying equipment.

BACKGROUND OF THE INVENTION

Prepared food products come in a wide variety of styles. Many prepared food products, whether ready-to-eat or those needing further cooking, are prepared with a coating that makes the food product more appealing. Such prepared food products include entrees, appetizers, desserts (such as pastries, donuts), etc., and includes meats, cheese, fruit and vegetables, etc. The types of coatings used on these food products include dry coatings such as flour, sugar and spice and the like. The application of a coating on prepared food products is generally common. In many cases, food products can receive a first coating application as a prerequisite for applying similar or other types of coatings or breadings, such as cracker meal or bread crumbs.

Generally, the food industry prefers to use automated and continuous food coating processes wherever possible. Additionally, processing facilities are often limited by space constraints and further strive to avoid unnecessary space consuming equipment to complete the coating process.

BRIEF SUMMARY OF THE INVENTION

In at least some embodiments, the apparatus for applying coating to food products relates to a drum assembly that includes a drum with one or more conical flights, wherein food products and coating are received at a drum intake end, and the coating is further applied to the products using a conical and rotational motion of the drum, and wherein the food products and coating are discharged at a drum discharge end.

In at least some other embodiments, the apparatus for applying coating to food products relates to a feed assembly; a vibratory frame assembly having vibratory frame side members; a pan assembly mounted to the first vibratory frame side members; one or more springs adapted to mount the pan assembly to the vibratory side members, the springs mounted at an angle θ above horizontal; a drum assembly, situated between the feed assembly and the pan assembly, the drum assembly including one or more conical flights situated therein; and a pair of motorized vibrators mounted and adapted to impart energy to the vibratory frame side members at an angle 13 below horizontal, wherein the pan assembly is adapted to vibrate having longitudinal and vertical vector components at a predetermined amplitude and frequency, and wherein the vibratory frame assembly is adapted to operate in a tuned and excited mode.

In at least yet some other embodiments, a method for applying coating to food products relates to receiving products and coating at an inlet end of a feed assembly, discharging the products and coating from the feed assembly into a drum assembly, applying coating to the products inside the drum assembly using a conical and rotational motion, discharging the coating and products from the drum assembly, and conveying the coating and products using vibratory motion.

In at least still some other embodiments, a method for applying coating to food products relates to inserting products and coating into a drum assembly, applying coating to the products inside the drum using a conical and rotational motion, and discharging the coating and products from the drum.

In at least still yet some other embodiments, an apparatus for applying coating to food products relates to a feed assembly; a conical drum assembly, a discharge assembly, and a coating recycle assembly.

BRIEF DESCRIPTION OF DRAWINGS

Embodiments of the conical drum breader and methods of use are disclosed with reference to the accompanying drawings and are for illustrative purposes only. The conical drum breader and methods of use are not limited in its application to the details of construction or the arrangement of the components illustrated in the drawings. The conical drum breader and methods of use are capable of other embodiments or of being practiced or carried out in other various ways. The drawings illustrate a best mode presently contemplated for carrying out the conical drum breader and methods of use. In the drawings.

DETAILED DESCRIPTION

Figure 1:
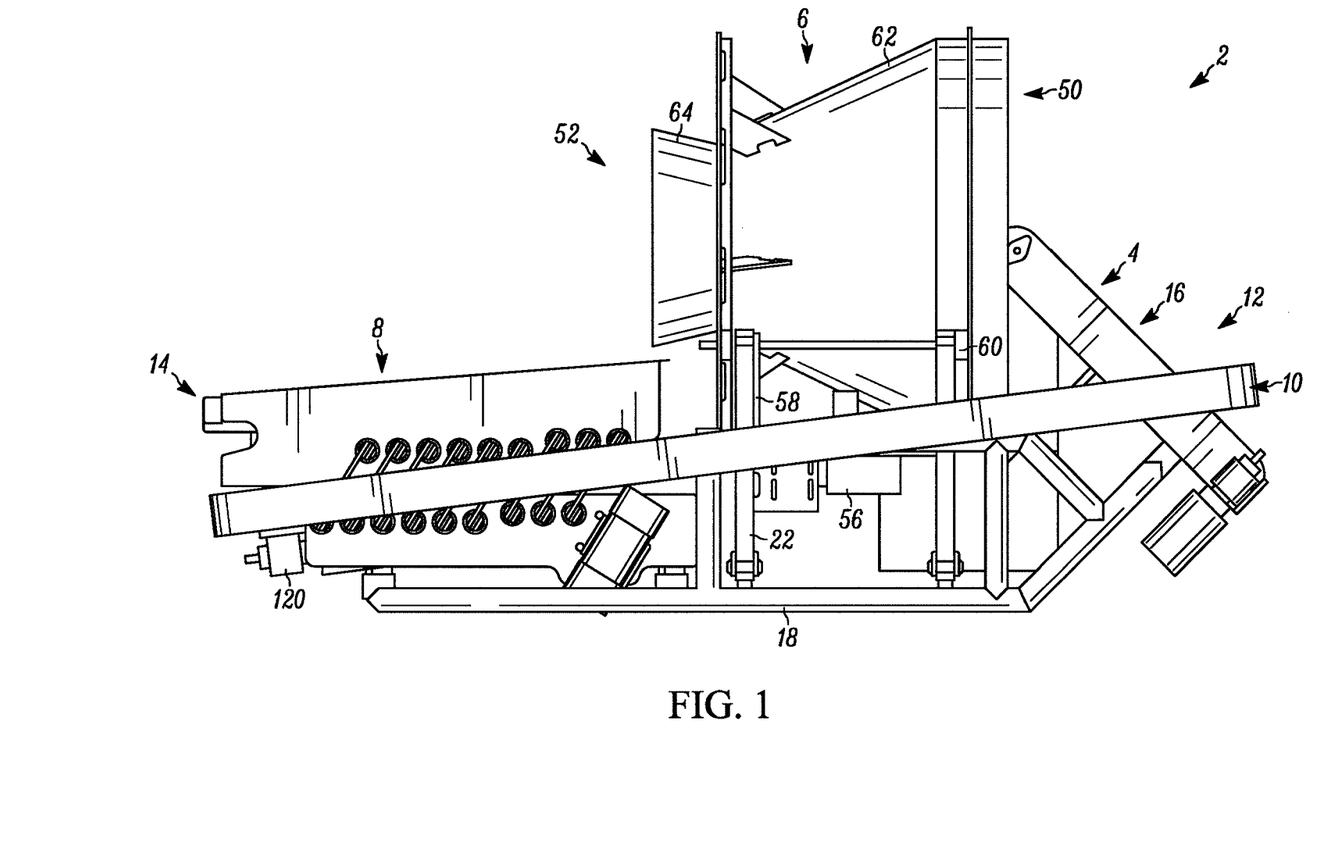
FIG. 1 is a side view of an exemplary embodiment of a conical drum breader apparatus for applying coating to food products including, a feed assembly, a drum assembly, a discharge assembly, and a coating recycle assembly.
Figure 2:
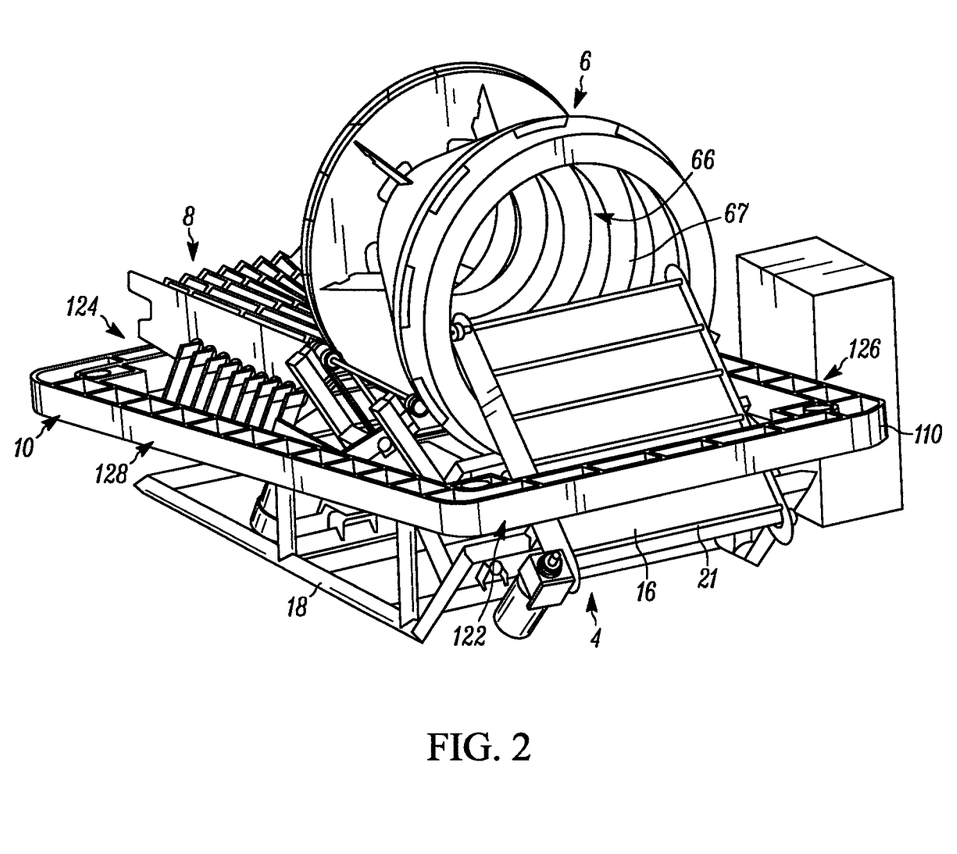
FIG. 2 is a front perspective view of the apparatus of FIG. 1.
Figure 3:
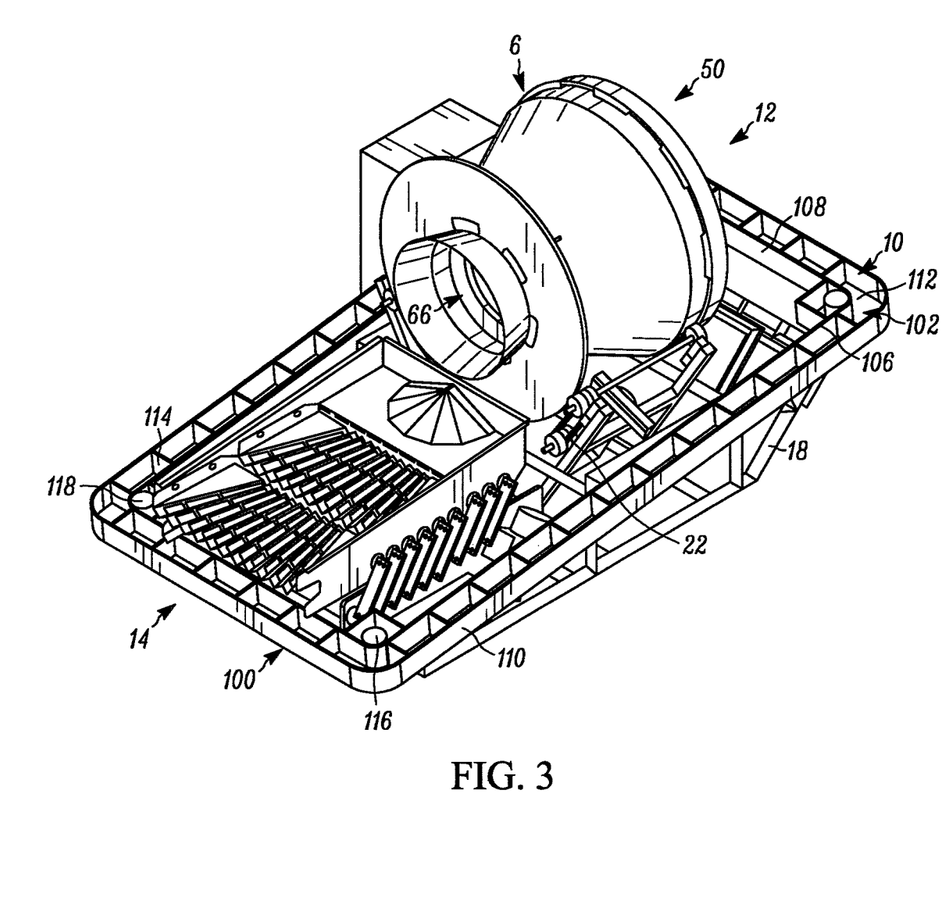
FIG. 3 is a rear perspective view of the apparatus of FIG. 1.

Referring to FIGS. 1, 2, and 3, an exemplary embodiment of a conical drum breader apparatus 2 for applying a coating to food products is illustrated. The apparatus 2 includes a feed assembly 4, a drum assembly 6, a discharge assembly 8, and a coating recycle assembly 10. In general, a coating is deposited at an inlet end 12 of the feed assembly 4, followed by food products. A portion of the coating is immediately applied to the products as the products are added on top of the coating. The coating and products are then conveyed into the drum assembly 6 via an inlet conveyor 16. The drum assembly 6 is utilized to apply the coating to the products via conical and rotation action. The coated products are then discharged from the drum assembly 6 onto the discharge assembly 8, wherein the coated products are separated and/or aligned via vibratory motion for further processing by hand or other machines, and subsequently discharged at a discharge end 14 of the apparatus 2. In addition, excess/unused coating is removed by the discharge assembly 8 and transferred by the coating recycle assembly 10 to the feed assembly 4 for application to the products.

Further referring to FIG. 1, the feed assembly 4, drum assembly 6, and discharge assembly 8 can be configured to allow the products to enter and exit the apparatus 2 at approximately the same or selectable elevations, if desired. Positioning the inlet end 12 and discharge end 14 at a substantially similar height can serve to obviate the need for another piece of equipment to re-position products to continue along a processing line. Although the apparatus 2 depicted in FIGS. 1-3 is configured to discharge the coated products (at the discharge end 14) at approximately the same elevation as the inlet end 12, the apparatus 2 can be configured to receive or discharge the food products at an elevation that is higher or lower than the inlet end 12 and/or discharge end 14, such as to accommodate the requirements of various types of other processing equipment used in associated processes.

As seen in FIGS. 1-3, a main frame 18 is utilized to provide support for various components. The drum assembly 6 includes a drum frame 22 that can be secured to the main frame 18; alternatively, the drum frame 22 can be free standing. In addition, the coating recycle assembly 10 can be secured to the main frame 18 or utilize a separate frame (not shown).

Figure 4:
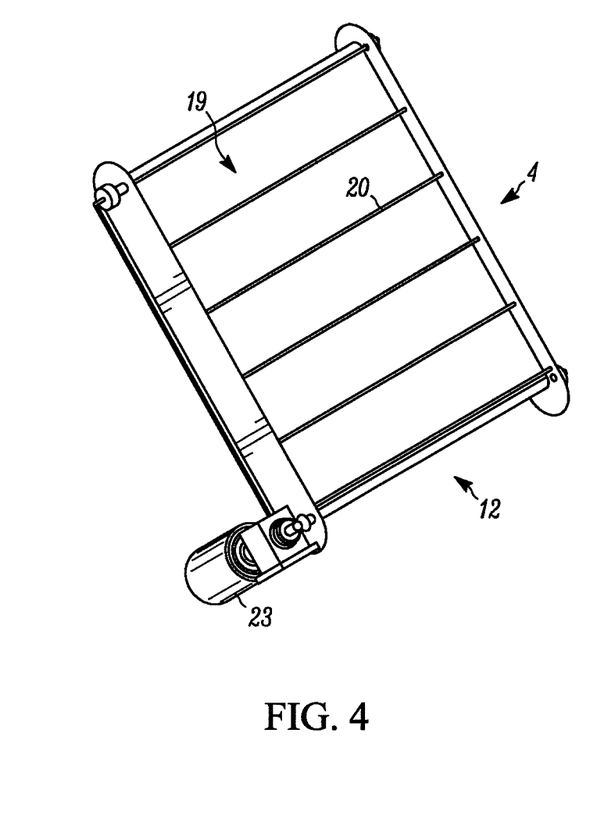
FIG. 4 is a front perspective view of the feed assembly of FIG. 1.

Referring now to FIG. 4, in at least some embodiments, the feed assembly 4 includes a conveyor belt 19 having a plurality of in-feed flights 20 for receiving and transporting coating and products. The coating is received from the coating recycle assembly 10 (discussed below) and the products are on-loaded from another process device (not shown) or operator (not shown) to the conveyor belt 19. The conveyor belt 19 is rotated about the feed assembly 4 using a conveyor drive 23, such as an electric motor drive. Coating is deposited at the inlet end 12 of the feed assembly 4, more particularly, on the conveyor belt 19 adjacent a channel opening 130 (see FIG. 8) of the coating recycle assembly 10, as discussed below. As coating can be applied to the conveyor belt 19 prior to receipt of the products, products that are deposited onto the conveyor belt 19 are immediately placed in contact with a portion of the coating. The coating and products are then conveyed into the drum assembly 6 to circulate the products and coating in a manner that allows the coating to be substantially evenly applied to the products. Aside from the aforementioned feed assembly 4, various other methods of transporting the products and coating to the drum assembly 6 can be utilized, such as a vibrational table.

Referring again to FIGS. 1-3, the drum assembly 6 is shown positioned to receive the coating and products from the feed assembly 4 at a drum intake end 50, and to discharge the coating and products onto the discharge assembly 8 from a drum discharge end 52. As seen in FIG. 1, in at least some embodiments, the drum assembly 6 includes a rotatable drum 54 and a drum drive motor 56. The drum drive motor 56 drives a belt 58 that in turn rotates rollers 60 on either side of the drum 54 for rotating the drum. In one embodiment, the drive motor 56 is an electric motor and two rollers 60 are situated about each side of the drum, wherein the motor 56 and rollers 60 are secured to the drum frame 22. Although not discussed in detail herein, the drum 54 can be rotated using one of numerous other systems known in the art, for example, a hydraulic drive system and a tooth and gear system.

Referring to FIGS. 1-3 and 5, in at least some embodiments, the drum 54 includes a drum input portion 62 and a drum output portion 64. The drum 54 includes one or more conical tumble flights 66 situated therein with a ridge 67 that extends inwards from a drum inner surface 69 and along a rotational path inside the drum from the drum intake end 50 to the drum discharge end 52. The configuration of the conical flights 66 moves the products and coating in a screw type fashion from the drum intake end 50 to the drum discharge end 52. As the drum 54 rotates, the products are repeatedly agitated with a rolling and falling motion to encourage various surface portions and folds (where applicable) of the products to be exposed and pressed against the coating. The circumference of the drum 54 as well as the rotational speed of the drum 54 substantially dictates the force of the agitation. Further, the input portion 62 of the drum. 54 is tapered and narrows as the drum extends from the drum intake end 50 towards the output portion 64. The length of the input portion L1 and the angle $\alpha 1$ (relative to horizontal) of the tapering can be modified to adjust the time the products are agitated inside the input portion 62. By reducing the circumference of the drum inner surface 69 extending towards the output portion 64, the products are maintained inside the input portion 62 for a longer time-period due to the resultant inclination. The input portion 62 is sized to accommodate the width and/or height of the processing equipment (typically a conveyor) utilized to supply products into the drum 54. In at least some embodiments, the input portion 62 has a diameter ranging from about 24 inches to about 96 inches, while in other embodiments the diameter can range from about 48 inches to about 96 inches, while in still other embodiments the diameter can vary further to accommodate design criteria, such as the size and height of the output of a machine feeding product into the input portion 62. The larger diameter allows the input portion 62 to rotate such that the loading point, the lowest part of the input portion during rotation, is positioned low enough to accept the input of products without having to provide an inclined conveyor to raise the height of the incoming product when supplied from another device. In addition, the larger diameter input portion 62 allows for a wide entrance point for products to enter. This allows the product to be fed into the drum 54 without having to substantially reduce the width of an incoming conveyor, which can slow down the input of product and result in a greater likelihood of product jamming at the input portion 62. In at least some embodiments, reducing the diameter of the input portion 62 below about 24 inches can limit the functionality of the conical drum breader apparatus 2, such that it would be unsuitable for its intended use, as such a reduced diameter would require an extra inclined conveying step and/or conveyor output reducing step to accommodate various product in-feed machines.

Figure 5:
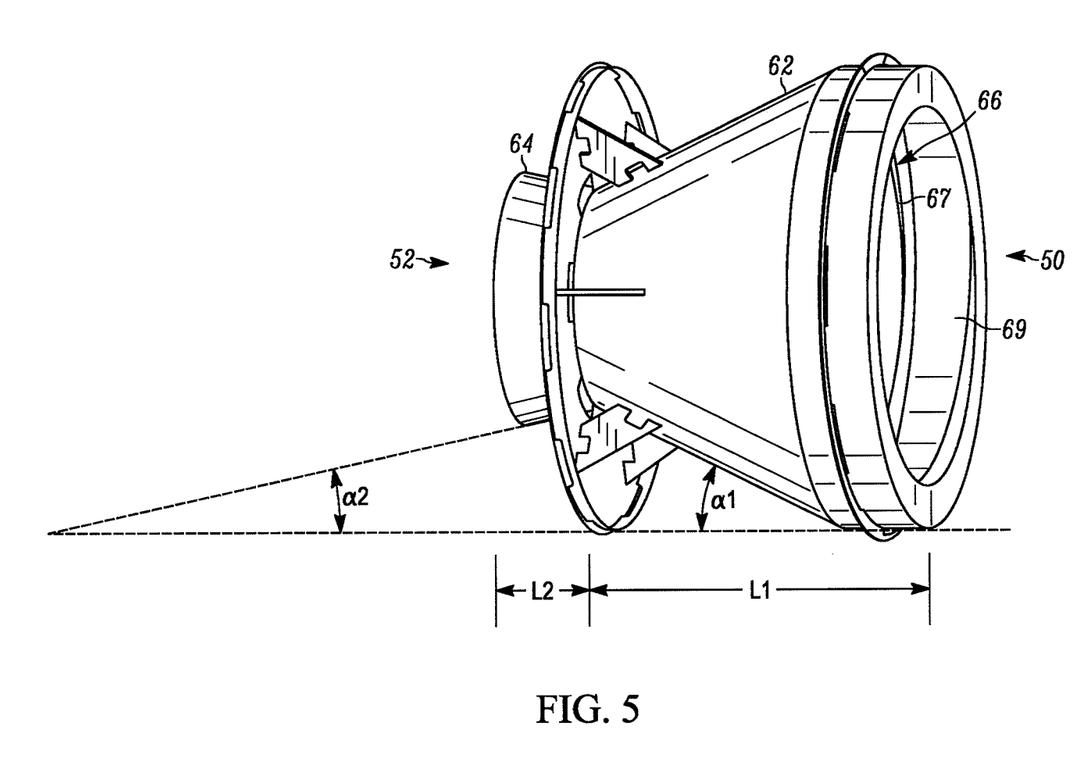
FIG. 5 is a side perspective view of the drum assembly of FIG. 1.

Similar to the input portion 62, the output portion 64 can also be tapered, although the circumference of the drum inner surface 69 expands as the drum extends away from the input portion 62 and towards the drum discharge end 52. The expansion of the drum inner surface 69 allows for the products and coating to be passed through the drum output portion 64 at a greater rate than they are passed through the drum input portion 62.

Figure 6:
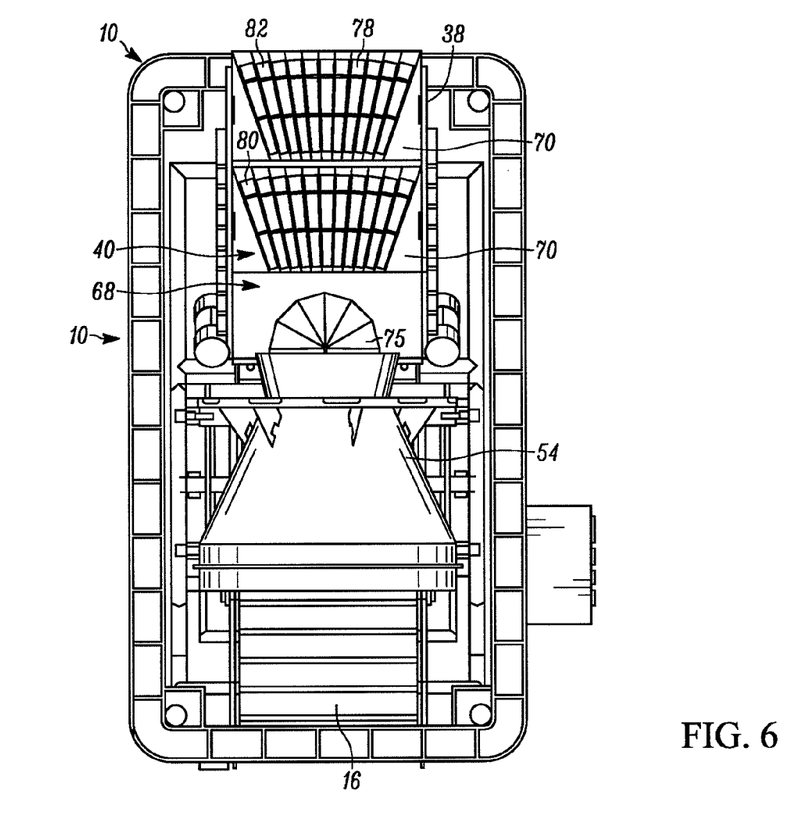
FIG. 6 is a top view of the assembly of FIG. 1.
Figure 7:
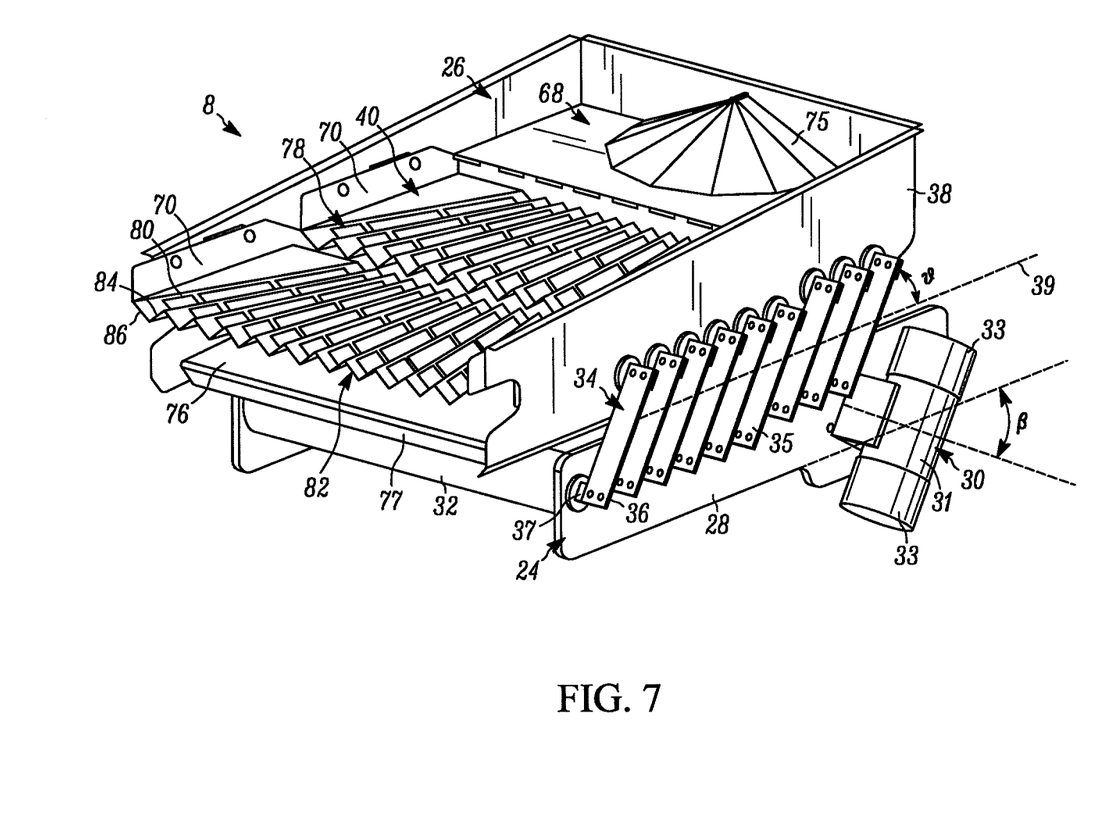
FIG. 7 is a front perspective view of the discharge assembly of FIG. 1.

Referring to FIGS. 6 and 7, in at least some embodiments, the discharge assembly 8 includes a vibratory frame assembly 24 in communication with the pan assembly 26 by way of a plurality of spring assemblies 34. The frame assembly 24 includes a pair of vibratory frame side members 28 each with a motorized vibrator assembly 30 mounted thereon, one or more cross-members 32, and a plurality of spring assemblies 34. In an exemplary embodiment, the motorized vibrator assembly 30 includes a motor 31 coupled to a pair of eccentric vibrators 33, for example, a pair of rotary magnetic vibrators such as the Motomagnetic electric vibrator as manufactured by Martin Engineering Nepoinset, IL Model ST12-1440. In one embodiment, the motor 31 is speed-controlled by an inverter (not shown), such as the POWERFLEX 40 as manufactured by Allen Bradley, although in another embodiment a hydraulic speed control can be used, for example of the type manufactured by Sun and Bosch. Further, the energy imparted to the vibratory frame side members 28 by the motorized vibrator assembly 30 is at least partially transferred from the vibratory frame assembly 24 to the pan assembly 26 by the plurality of spring assemblies 34.

In at least some embodiments, each spring assembly 34 includes one or more springs 35 with a spring fastener 36 at both ends of the spring 35, where the spring fastener 36 secures the springs 35 adjacent to each other and can also secure them to protrusions 37 on both sides of the pan assembly 26 and the vibratory frame side member 28. In at least one embodiment, the springs 35 are leaf springs, although other types of springs have been contemplated. Further, the springs 35 can be constructed from high performance composite materials, such as, but not limited to, E-glass/epoxy, carbon fiberglass/epoxy, (carbon/glass)/epoxy, fiberglass/polyester, and high temperature glass/epoxy in cross-ply, spring orientation and unidirectional (e.g., 80%) pre-preg constructions available from Composiflex, Inc., Erie, Pa. In an exemplary embodiment the protrusions 37 can be cast brackets that are welded in place, although other spring assembly fastening methods have been contemplated. Further, in an exemplary embodiment, three springs 35 can be used for each spring assembly 34 and eighteen spring assemblies 34 can be used (nine spring assemblies 34 located on each side of the apparatus 2). The number of spring assemblies 34 provided are largely dependent on the weight of the pan assembly 26 (greater weight requires more springs), and therefore, the number of spring assemblies 34 can increase or decrease in quantity and size as is necessary to compensate for the weight.

The selection of spring quantity and spring constants can be derived in one embodiment by the following: given a natural frequency ($F_n$ in cycles per minute) and pan assembly mass (m in pounds-mass) (i.e., the total mass of the pan assembly and the sum of all the individual spring constants ($\Sigma K$ in pounds per inch)) is equal to the number of springs 35 (assuming each spring has the same constant) multiplied by $(\pi F_n/30)^2(m/386)$. Thus, the spring constant for each spring 35 is $\Sigma K$ divided by the number of springs 35.

In an exemplary embodiment, the spring constant is about 95 pounds/inch, the width of each spring 35 is about 2½ inches, the length of each spring is about 14 inches and the thickness of each spring is about ¼ inch, although other values have been contemplated. In another embodiment the spring can range in length from about 10 inches to about 20 inches, the spring thickness can be from about ⅛ inch to about ½ inch and the spring width can be from about 1 inch to about 4 inches, although other values have been contemplated. Additionally, the size of the spring 35 can control the stroke (distance traveled by the pan assembly 26 as measured from the oscillation spring end secured to the pan assembly 26). In an exemplary embodiment the stroke can range from about ¼ inch to 1½ inches, more particularly about 1 inch, although other values have been contemplated. In terms of overall design, in an exemplary embodiment the spring constant is designed such that the operating frequency $F_o$ of the vibratory frame side members 28 is about 20-40% of their natural frequency $F_n$, more particularly, $F_o$ is about 33% of $F_n$, although other values have been contemplated. As discussed above, based on the desired size and resultant weight of the pan assembly 26, various components such as the aforementioned, can be sized differently as necessary to produce the desired vibratory action.

The motorized vibrator assemblies 30 impart an oscillating force on the pan assembly 26. The frequency of the oscillating force imparted depends on the speed of the motor 31, with the speed of motor 31 being dependent on the accumulation of the spring constants of springs 35 versus the weight of the pan assembly 26. In an exemplary embodiment the speed can vary from about 600 rpm to about 1200 rpm, for example, about 850 rpm, although in other embodiments the speed can vary from about 100 rpm to about 2000 rpm. Referring particularly to FIG. 7, each motorized vibrator assembly 30 is adapted to impart energy to the vibratory frame side members 28 at an angle β below a horizontal axis 39. In an exemplary embodiment, β ranges from about 15 degrees to about 30 degrees, for example, about 22 degrees. In another exemplary embodiment, angle β can range from 0 degrees to about 80 degrees, although in other embodiments, β can vary more or less. The spring assemblies 34 are secured to the pan assembly 26 at an angle θ above the horizontal axis 39. In an exemplary embodiment θ can be between about 15 degrees and about 85 degrees, for example, about 68 degrees. Although in other embodiments θ, can vary more or less. In at least one embodiment, the angle 13 can be substantially equal to 90 degrees minus angle θ.

Referring to FIGS. 6 and 7, in at least some embodiments, the pan assembly 26 further includes a pair of pan side portions 38 having a shaker path 40 positioned therebetween for receiving coating and products from the drum assembly 6. The shaker path 40 can include a load spreader 68 and one or more separator and/or alignment trays 70 configured in series and extending from the load spreader 68 to the discharge end 14 of the apparatus 2. The load spreader 68 is configured to receive the coating and products and spread the received products along a width of the shaker path 40 as the products are conveyed along the shaker path 40 by the vibratory motion towards the trays 70. In at least one embodiment, the load spreader 68 includes a semi-conically shaped ramp 75 to assist with separating, although other embodiments can include various other configurations to facilitate separating the products and coating along the shaker path 40. A lower surface 76 extends along the bottom of the pan assembly 26 between the pan side portions 38. Products and coating that are spread and vibrated along the load spreader 68 are subsequently conveyed onto the trays 70. The trays 70 are positioned above the lower surface 76 and in at least some embodiments the trays 70 can be self-contained and removable to facilitate easy cleaning of the apparatus 2.

In at least some embodiments, the trays 70 include corrugations 78. These corrugations 78 form tray channels 82, wherein the tray channels 82 have a top edge 84 and a bottom edge 86 (as shown in FIG. 7), and are used to elongate and align the products as the products are vibrated along the trays 70 towards the discharge end 14. In an exemplary embodiment, the inclusive angle between adjacent top edges 84 can range from about 60 degrees to about 160 degrees, for example 90 degrees, although it has been contemplated that in another embodiment the angle can further vary. In an exemplary embodiment, the top edges 84 can have a spacing there-between of about 3 5/16 inches, and a height from top edge 84 to bottom edge 86 of about 1 9/16 inches, although it has contemplated that in another embodiment the top edges 84 can have a spacing there-between of about 2 inches to about 6 inches, and a height from top edge 84 to bottom edge 86 of about one inch to about four inches. Additionally, the spacing and height can be lesser or greater as dictated by the size of the products being processed. In addition, a plurality of coating passages 80 are provided along the trays 70 to allow the unused coating (i.e., loose coating not adhered to the products) to be sifted through the trays 70 and onto the lower surface 76. The lower surface 76 is positioned above the vibratory frame assembly 24 and includes a ledge 77 that extends beyond the vibratory frame assembly 24. Coating that sifts through the passages 80 lands on the lower surface 76 and is subsequently vibrated towards the ledge 77. The ledge 77 is positioned over a lower portion 124 (discussed below) of the coating recycle assembly 10, wherein the unused coating is received by the lower portion 124 and subsequently conveyed to the feed assembly 4 for application to the products.

The trays 70 and other portions of the apparatus 2 can be designed to be the same width of conveyor belts and other devices used to up-load and off-load products to and from the apparatus 2 such that the products can move between the apparatus 2 and other devices without rearranging the width of path of the products traveling through the apparatus 2. In addition, in at least some embodiments, the products exits the apparatus 2 at substantially the same elevation as it enters the apparatus 2, thereby avoiding having to add process equipment to adjust the height of product received from other devices used with the apparatus 2 and avoiding the need for workers having to adjust their stance when working on the apparatus 2. Still further, the pan assembly 26 can be configured to be as wide or narrow as other process equipment used in conjunction with the apparatus 2, such as a conveyor used to off-load products at the discharge end 14. For example, the pan assembly 26 can be 24", 34" or 40" wide, although additional widths are also within the scope of the conical drum breader and methods of use. By using a pan assembly width that is the same width as other food processing equipment located at the discharge end 14 of the apparatus 2, throughput of products are less likely to be inhibited throughout a process. In addition, the use the trays 70 to spread and align products can eliminate the need for a secondary process (and additional process equipment) of spreading and aligning products to a desired position, thereby improving throughput.

Figure 8:
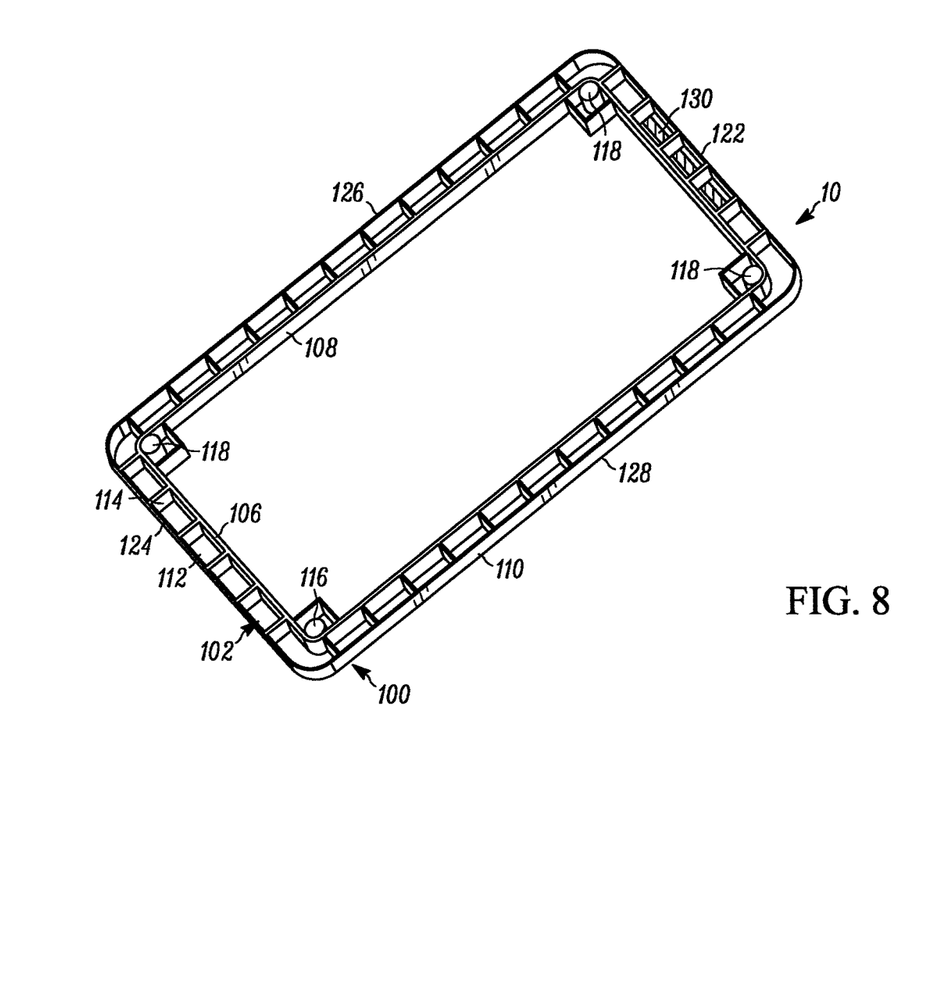
FIG. 8 is a top perspective view of the coating recycle assembly of FIG. 1.

To provide for the efficient use of coating, the coating is recycled using the coating recycle assembly 10, as seen in FIGS. 3 and 8. The coating recycle assembly 10 can include a fill hopper (not shown) for adding coating to the assembly 10 as needed to supplement coating that is adhered to the products. The coating recycle assembly 10 includes a recycle conveyor 100 having a conveyor channel 102 that is mounted to a frame, such as frame 18, and a drag-chain belt 106 situated at least partially within the conveyor channel 102. The conveyor channel 102 includes an inner side wall 108, an outer side wall 110, and a bottom portion 112. In one embodiment, the drag-chain belt 106 is a solid synthetic with tracking lugs (or drive cogs) (not shown) on one side facing the inner side wall 108 and a plurality of flights 114 extending from the opposite side facing the outer side wall 110. The lugs can be secured to the drag-chain belt 106 using a fastener or they can be integrally molded with the drag-chain belt 106 thereby eliminating crevices, fissures, hinges or other structures where coatings and/or topping can become lodged and impede cleaning of the belt. In at least one embodiment, the drag-chain belt 106 can be made of polyester thermal plastic, polyurethane, or another material that can be sufficiently cleaned to meet food process industry standards. An exemplary drag-chain belt 106 is a SuperDrive from Volta of Karmiel, Ill. Another exemplary drag-chain belt 106 is a plastic flighted belt, a Series 800 Open Hinge Impact Resistant Flight model available from Intralox, LLC of Harahan, La.

The flights 114 can vary in size to accommodate the transport of more or less coating, although in one embodiment, the flights 114 are 6 inches by 6 inches. Further, the flights 114 can be oriented at various angles with respect to the inner and outer side walls 108, 110, and the bottom portion 112. In at least some embodiments, the flights 114 are oriented perpendicular to each of the inner and outer side walls 108, 110, and the bottom portion 112.

In an exemplary embodiment, as seen in FIG. 8, the coating recycle assembly 10 is in a rectangular configuration having four corners, where one of the corners includes a sprocketed drive 116 that engages the cogs of the drag-chain belt 106, and the other three corners have drive belt rollers 118 for guiding the abutted drag-chain belt 106, to form a rectangular shape for rotation of the belt 106. The sprocketed drive 116 is received on a drive shaft (not shown). An overhung load adaptor (not shown) and a recycle conveyor motor (shown in FIG. 1 as 120), such as a hydraulic or electric motor, are used to rotate the drive shaft. Additionally, the use of a rectangular shaped recycle conveyor 100 permits the drag-chain belt 106 to be wrapped around the apparatus 2, thereby allowing a reduction in the overall footprint of the apparatus 2. Although the recycle conveyor 100 is shown and described as rectangular, other configurations can be used as well, for example, circular or square.

Further referencing FIGS. 2 and 8, the conveyor channel 102 includes an upper portion 122, a lower portion 124, an ascending portion 126, and a descending portion 128. The upper portion 122 includes a channel opening 130 in the bottom portion 112 configured to allow recycled coating to flow from the conveyor channel 102 onto a surface below, such as the conveyor belt 19 and/or upper surface of the products. During operation of the coating recycle assembly 10, the coating is initially fed into the fill hopper (not shown) or placed directly into the conveyor channel 102 to prime the recycle conveyor 100. The coating is then carried by the drag chain belt 106 up the ascending portion 126 and across the upper portion 122. It is then deposited through the channel opening 130 in the center of the upper portion of the conveyor channel 102. The amount of coating that flows through the channel opening 130 can be metered by an adjustable opening (e.g. a metered slide gate) (not shown) along the bottom portion 112 above the conveyor belt 19. The adjustable opening can be manually operated, although it has been contemplated that it can also be controlled automatically. Alternatively, the adjustable opening can be omitted and a non-adjustable opening can be used. Once the recycle conveyor 100 has been primed and in operation, it will receive the unused coating from the discharge assembly 8, as discussed above. In this manner the coating recycle assembly 10 will require the addition of new coating only, to supplement the coating that adhered to the products.

The components and sub-components of the aforementioned apparatus 2 can be formed from metal, such as stainless steel, although it has been contemplated that other materials may be used such as plastic or mild steel with a protective coating. Further, the overall dimensions of the apparatus 2 can be configured to accommodate space constraints and products production capacity requirements. Additionally, the numerical ranges in this disclosure are approximate, and thus may include values outside of the range unless otherwise indicated. Various components/connections such as wiring, hydraulic lines, actuators, inverters, sensors, etc., have not been illustrated, although they should be understood to be included. Further, all of the hydraulic and electronic components discussed herein can be controlled by one or more programmable devices such as a programmable logic controller (PLC) and/or various manual or automatic discreet controls, for example hand operated starters and drive controllers. A control box 132 (FIG. 2) can be mounted to the frame 18 to house various components, controls, and drives.

While the conical drum breader and methods of use has been described in conjunction with the exemplary embodiments outlined above, various alternatives, modifications, variations, improvements, and/or substantial equivalents, whether known or that are or may be presently unforeseen, may become apparent to those having at least an ordinary skill in the art. Accordingly, the exemplary embodiments of the conical drum breader and methods of use as set forth above are intended to be illustrative, not limiting. Various changes may be made without departing from the spirit and scope of the conical drum breader and methods of use. Therefore, the conical drum breader and methods of use are intended to embrace all known or earlier developed alternatives, modifications, variations, improvements and/or substantial equivalents. It is specifically intended that the conical drum breader and methods of use not be limited to the embodiments and illustrations contained herein, but include modified forms of those embodiments including portions of the embodiments and combinations of elements of different embodiments as come within the scope of the following claims.

We claim:

1. An apparatus for applying coating to food products comprising:
   a drum assembly that includes a drum with one or more conical flights, wherein food products and coating are received at a drum intake end, and the coating is further applied to the products using motion of the drum, and wherein the food products and coating are discharged at a drum discharge end;
   a feed assembly for conveying food products and coating to the drum intake end;
   a discharge assembly for conveying food products and coating discharged from the drum discharge end, the discharge assembly including a vibratory frame assembly and a pan assembly, with the pan assembly having a load spreader and one or more trays for at least one of separating and aligning the food products using vibratory motion.

2. The apparatus of claim 1, wherein the drum further includes a drum input portion positioned adjacent to the drum intake end and a drum output portion positioned adjacent the drum discharge end, wherein the drum input portion has a tapered circumference that decreases in size extending from the drum intake end towards the drum output portion, and wherein the drum output portion has a tapered circumference that decreases in size extending from the drum discharge end towards the drum input portion.

3. The apparatus of claim 1, wherein the feed assembly includes a conveyor belt with in-feed flights.

4. The apparatus of claim 1, wherein the pan assembly includes pan side portions and a lower surface, wherein the one or more trays are situated between the pan side portions and above the lower surface.

5. The apparatus of claim 4, wherein the one or more trays include a plurality of adjacent corrugations positioned between the pan side portions, for aligning the coated food products as they are vibrated across the trays.

6. The apparatus of claim 5, wherein the one or more trays include one or more passages for allowing coating to sift therethrough.

7. The apparatus of claim 6, wherein the sifted coating is collected by the lower surface of the pan assembly for recycling.

8. The apparatus of claim 7, wherein the sifted coating is deposited into a recycle conveyor and conveyed to the feed assembly for application to products.

9. The apparatus of claim 8 wherein the recycle conveyor includes a conveyor channel having a lower portion, an upper portion, an ascending portion, a descending portion, and a looped drag-chain belt having one or more flights situated at least partially in the channel for transporting coating from the lower portion to the upper portion via the ascending portion, with the lower portion receiving coating from the pan assembly, and the upper portion releasing coating at the feed assembly.

10. The apparatus of claim 1, wherein the vibratory frame assembly includes a motor vibration assembly and the vibratory frame assembly is in communication with the pan assembly by spring assemblies that are capable of moving the pan assembly with vibratory motion.

11. The apparatus of claim 10 wherein the spring assemblies each include leaf springs.

12. The apparatus of claim 11 each spring assembly includes longitudinally spaced-apart leaf springs situated in a parallelepiped orientation.

13. The apparatus of claim 10 wherein the spring assemblies each include leaf springs, wherein the leaf springs within each spring assembly have a substantially equal spring constant.

14. The apparatus of claim 1 wherein the load spreader includes a semi-conically shaped ramp that spreads the products outwardly towards the pan side portions.

15. The apparatus of claim 1 further comprising a recycle conveyor for receiving coating from the discharge assembly and conveying the coating to the feed assembly, the recycle conveyor including a conveyor channel having a lower portion, an upper portion, an ascending portion and a descending portion, and a looped drag-chain belt having one or more flights situated at least partially in the channel for transporting coating from the lower portion to the upper portion via the ascending portion, with the lower portion receiving coating from the discharge assembly, and the upper portion releasing coating at the feed assembly.

16. An apparatus comprising:
    a feed assembly;
    a vibratory frame assembly having vibratory frame side members;
    a pan assembly mounted to the first vibratory frame side members;
    one or more springs adapted to mount the pan assembly to the vibratory side members, the springs mounted at an angle $\theta$ above horizontal;
    a drum assembly, situated between the feed assembly and the pan assembly, the drum assembly including one or more conical flights situated therein; and
    a pair of motorized vibrators mounted and adapted to impart energy to the vibratory frame side members at an angle $\beta$ below horizontal,
    wherein the pan assembly is adapted to vibrate having longitudinal and vertical vector components at a predetermined amplitude and frequency, and wherein the vibratory frame assembly is adapted to operate in a tuned and excited mode.

17. The apparatus of claim 16, wherein each of the springs are configured in a plurality of spring assemblies each comprising one or more leaf springs, and the spring assemblies are in spaced-apart relation longitudinally and situated in a parallelepiped orientation, with each of the springs having a substantially equal spring constant.

18. The apparatus of claim 17, wherein the angle θ is in the range of about 15 degrees to about 85 degrees, and the angle β is in the range of about 90 degrees minus θ.

19. The apparatus of claim 18 further comprising a recycle conveyor for receiving coating from the pan assembly and conveying the coating to the feed assembly.

20. The apparatus of claim 19 wherein the recycle conveyor includes a conveyor channel having a lower portion, an upper portion, an ascending portion and a descending portion, and a looped drag-chain belt having one or more flights situated at least partially in the channel for transporting coating from the lower portion to the upper portion via the ascending portion, with the lower portion receiving coating from the pan assembly, and the upper portion releasing coating at the feed assembly.

* * * * *